Patented Jan. 6, 1931

1,787,586

UNITED STATES PATENT OFFICE

IRA G. McBETH AND JOHN R. ALLISON, OF WHITTIER, CALIFORNIA, ASSIGNORS TO LEFFINGWELL RANCHO COMPANY, OF WHITTIER, CALIFORNIA, A CORPORATION OF CALIFORNIA

INSECTICIDE AND FUNGICIDE

No Drawing.   Application filed August 20, 1927.   Serial No. 214,448.

This invention relates to insecticides and fungicides, and is more particularly related to insecticides and fungicides such, for example, as are adapted for use in the preparation of spray compounds and emulsions and to the methods of producing and combining the same.

For many years, petroleum oils have been used for controlling the growth of insects and fungus on trees, plants and other vegetation. However, the injury to the trees and fruit caused by the use of these petroleum oils combined with the unsatisfactory control or killing of the insects and fungus has greatly limited the use of these petroleum oils. Sulfur sprays have failed to satisfactorily control what is known as San Jose scale and red spider on deciduous fruits, and hydrocyanic acid gas has failed to satisfactorily combat scales on citrus fruit making necessary the discovery of new and improved insecticides and fungicides.

Recently resort has been made to the use of highly refined, slow drying oils of the lubricant type in the place of the kerosene products heretofore employed. This use of the highly refined, slow drying oils of the lubricating type gave great promise of improved results over the kerosene products. It has developed, however, from the use of these slow drying oils of the lubricating type that the smothering effect of the oil which is relied upon to kill the insect often reacts unfavorably upon the tree and fruit. The injurious results that have followed the application of these heavy smothering oils is evident from the impaired quality of the fruit and the killing of fruit wood and, in some cases, serious losses due to the dropping of fruit. These smothering oils when applied to oranges during certain seasons result in the following set or crop of fruit being greatly reduced in number.

It is, therefore, an object of this invention to provide a method of preparing and combining insecticides in such a manner that the same will make possible the control of the most resistant insects and fungus without injury to the tree and fruit.

Another object of this invention is to provide a method of preparing insecticides and fungicides to produce a product which will penetrate the insect and carry into the insect a toxic substance and at the same time prevent the expelling of the poison by the insect, the treatment being obtained in a manner that will not be injurious to the fruit and tree.

Another object of this invention is to provide a fungicide and insecticide including a light petroleum, animal, or vegetable oil such, for example, as a product of the kerosene or light lubricating type which will penetrate the various insects readily, and which product is more or less toxic, with a heavy, slow drying petroleum, animal or vegetable oil of the lubricating type which penetrates the tracheal tubes of the insects much more slowly but are not readily expelled by the insect and by means of which the insect is prevented from expelling the lighter and more penetrating oil.

Another object of this invention is to provide in an insecticide or fungicide a toxic substance including an alkaloid compound formed to provide a long chain alkaloid compound such, for example, as an alkaloid compound of oleic or similar long chain acids.

Another object of this invention is to provide in an insecticide or fungicide a toxic compound of an alkaloid and hydrocyanic acid.

Another object of this invention is to provide in an insecticide or fungicide a toxic substance including a compound of oleic acid and hydrocyanic acid compound with an alkaloid.

Other objects and advantages of this invention it is believed will be apparent from the following detailed description of a preferred embodiment thereof.

We have discovered that if emulsions prepared from light oil are blended with emulsions prepared from heavy slow drying oils of the lubricating type, a product will be produced which will readily penetrate the insects to be treated thereby. The insecticide thus formed cannot be thrown off or expelled by the insects. The heavy oil acts to retain the same penetrated within the insect, also causing smothering of the insect. By "slow drying oils" as used herein is meant any slow drying oils, whether of animal, vegetable, marine or mineral origin, such as, for example, olive oil, castor oil, sesame oil, or lubricating mineral oil having a viscosity range hereinafter given.

We have also found that it is essential to the proper care of trees and in order to obtain the proper fruit production therefrom that as little of these oil products be employed as is practically feasible for the control of the insects and fungus; and that the quantity of these oils or oil emulsions that is required to be employed as a spray (in combating these insects and fungus) is greatly reduced if a toxic substance is combined with the oil or oil emulsion in such a manner that the toxic substance will be carried by the oil or oil emulsion into the insect. The carrying of these toxic substances into the insects employing a blended compound of a low viscosity oil and an oil of the lubricating type of a higher viscosity is also found to be very beneficial in that the light oil aids in the penetration of the compound carrying the toxic substance into the insect while the heavier oil maintains the toxic substance within the insect thereby killing the insect with a lesser quantity of the oil or oil emulsion and in a more rapid and effective manner.

In accordance with this invention, the light and heavy emulsions may be blended or mixed together substantially as follows:

An emulsion is preferably first prepared of a fairly light penetrating oil of the kerosene or lighter lubricating oil type containing a sufficient quantity of unsaturated hydrocarbons to make the oil quite toxic to the insect to be controlled and yet sufficiently refined that it does not produce injury to vegetation when properly applied. The character of the insect to be destroyed and the readiness with which the plant is injured will make necessary the modification of the spray material to be used to meet particular conditions. A second emulsion is prepared from a refined, slow drying oil for example oils varying in viscosity from 85° to 120° at 100° F. have been used on different insects with satisfactory results.

The two emulsions prepared are then mixed, which may be readily accomplished by using any one of a number of well known or commonly used emulsifying apparatuses or by dropping the two emulsions into a mixer and thoroughly blending the two products. If preferred, the emulsion may be prepared in the same emulsifying apparatus by converting one insecticide into an emulsion and then adding emulsifying material and proceeding to emulsify the second emulsion or with some types of emulsifying agents, the emulsifying material may be added at the start, and the oil or other insecticides added separately.

The percentage of the two oils or emulsions used may be varied as desired. This blending of insecticide emulsions is for the purpose of securing penetration of a toxic substance into the insect and at the same time covering the insect with a viscous, slow drying coating which will prevent the insect from expelling the poison. The results produced by this blending of the two types of emulsions specified is in no way similar to the results secured by the mixing or blending of different oils or other insecticides prior to emulsification; in fact, the purpose of the compound emulsion is to prevent blending or mixing the insecticides formed thereby by converting each oil separately into an emulsion, the individual materials being held separate by the film of emulsifying material with which it is surrounded.

In order to secure the best results, it is believed desirable to go a step further and prevent, as far as possible, the blending of the two insecticides on the sprayed vegetation. If quick breaking emulsions are used, the emulsifying film is broken at the time the insecticide leaves the spray nozzle and the different insecticides strike the vegetation at approximately the same time. When water alone is used as the diluent owing to the surface tension phenomena, the water runs off of the sprayed vegetation and the insecticide, particularly if of a viscous, sticky nature, adheres to the vegetation and a more or less complete blending of the two insecticides will result after it has been applied to the plant. The blending or coalescing of the insecticides on the sprayed vegetation can be largely overcome by adding to the spray water various materials such, for example, as casein, skim milk, milk sugar, soap bark, saponin, albumen, or other materials which bring about the necessary change in the surface tension phenomena of the sprayed vegetation, insecticides and the spray water. Of these materials, we prefer to use an albumen solution for the reason that this solution is not only helpful in preventing blending of the insecticides or oil emulsions, but also appears most effective in bringing about a desirable change in the surface tension of the sprayed vegetation and the spray material or emulsion, causing the vegetation to become moistened with the spray water solution which, in some cases, is of value in preventing the excess absorption of the insecticide by the plant.

In order to reduce the quantity of the spray material or oil emulsions required, particularly upon plants found to be sensitive to oil, the dissolving of other poisons preferably in the lighter and more penetrating portion of the insecticide has been found extremely valuable. This combining of the two or more insecticides with an added poison has been found to be extremely advantageous where it is desired to control two or more insects in one operation as for example, scale, spider and aphis.

The poison added to the insecticide should be such a compound as is insoluble in or slightly soluble in water but soluble in the oil of the emulsion. The compounds found most valuable for increasing the toxicity and therefore the killing power of these petroleum oil emulsions we have found are those belonging to or closely related to the alkaloid and cyanogen groups which are soluble in oil or may be rendered soluble in oil by converting the same into special compounds as, for example, nicotine oleate, highly refined pyridine, or the oleate compounds of pyridine, nicotine, or the like. The oleate compounds are rather soluble in oil and oleic acid is a long chain compound which increases the toxicity of the alkaloids employed and is therefore a very advantageous substance to employ. The employment of such toxic or poisonous compounds which are soluble in oil makes the combined insecticides very powerful, greatly increasing their efficiency, and reducing the quantity of the same required to be employed to control or kill the insects and fungus.

The dissolving of these toxic substances in one phase of the combined emulsion preferably that phase which is of the penetrating character not only increases the effectiveness of the insecticide produced but reduces the danger to the plant and in the case of an alkaloid, alkaloid compounds, alkaloid cyanate compounds, and the like, it makes the application of the insecticide less objectionable from the standpoint of the sprayer.

Certain of the alkaloids such, for example, as pyridine have a tendency to separate or diffuse out of the oil into the water phase of the spray solution. In these cases, it is desirable to combine the toxic substance such as pyridine with a long chain organic acid as oleic acid, which will convert the compound produced into a compound insoluble or very slightly soluble in water but soluble in the oil.

The use of cyanogen derivatives, such as hydrocyanic acid, has been used with rather marked success on scale insects on citrus fruits in California. The method employed for the application of hydrocyanic acid is what is commonly known as fumigation. In recent years scale of citrus fruits has developed which is resistant to hydrocyanic acid making this method no longer successful in many districts. We have found that hydrocyanic acid may be advantageously combined with oleic acid or with an alkaloid or alkaloid compounds and used directly in the spray. The best results we have found require that the hydrocyanic acid be added to the alkaloid or alkaloid compound to the saturation point. In the preparation of these toxic substances, we have found that a double salt of oleic and hydrocyanic acid with an alkaloid compound produces extremely beneficial results and believe that this compound may be most easily produced by first treating the alkaloid with oleic acid and then treating the resultant compound with hydrocyanic acid. A double salt is apparently formed, however, and the hydrocyanic acid is loosely held and may be held in the double bond within the oleic acid so that the same is apparently easily liberated after the compound has been sprayed, making a powerful insecticide. In order to produce this compound, the hydrocyanic acid, oleic acid, and an alkaloid, the following proportions are preferably employed:

*Pyridine cyanide oleate compound*

| | |
|---|---|
| Hydrocyanic acid | 1 part |
| Pyridine | 3 parts |
| Oleic acid | 7 parts |

*Nicotine cyanide oleate compound*

| | |
|---|---|
| Nicotine | 5 parts |
| Hydrocyanic acid | 1 part |
| Oleic acid | 12 parts |

In preparing alkaloid oleates which are also advantageously employed as the toxic substance in insecticides, the following proportions are preferably combined in the case of pyridine and nicotine. When employing other alkaloids or other long chain acids the correct amount of each constituent will be determined by the molecular structure:

| *Pyridine oleate* | | *Nicotine oleate* | |
|---|---|---|---|
| | Parts | | Parts |
| Pyridine | 3 | Nicotine | 3 |
| Oleic acid | 7 | Oleic acid | 7 |

Having fully described our invention, it is to be understood that we do not wish to be limited to the details herein set forth but our invention is of the scope of the appended claims.

We claim:

1. A method of preparing insecticides which includes preparing an emulsion of a light oil having toxic properties, preparing a second emulsion of a heavy, slow-drying oil, and mixing the emulsions so produced.

2. A method of preparing insecticides which includes preparing an emulsion of a light oil, adding to the emulsion of the light oil a toxic substance, preparing a second emulsion of a heavier oil, and mixing the emulsions.

3. An insecticide comprising an emulsion of a light penetrating oil having toxic properties, and an emulsion of a heavier slow drying oil of the lubricating type.

4. A spray emulsion including an emulsion of a light oil, an emulsion of a heavy oil, and an alkaloid compound.

5. A method of preparing insecticides comprising forming an oil soluble toxic alkaloid compound, mixing said oil soluble compound with a penetrating oil, forming an emulsion of said penetrating oil, preparing an emulsion of a slow drying oil, and blending the two emulsions thus formed without causing coalescence thereof.

6. A method of preparing insecticides which includes treating a toxic substance belonging to alkaloid and cyanogen groups with a fatty acid to form a compound soluble in oil, mixing said compound with a penetrating oil, forming an emulsion of said penetrating oil and compound, preparing an emulsion of a slow drying oil, and then mixing the two emulsions thus formed without causing coalescence thereof.

7. A method of preparing insecticides which includes treating a toxic substance belonging to a group embracing alkaloids and cyanogen with a fatty acid, then treating the product with hydrocyanic acid so as to form a compound soluble in oil, mixing said oil soluble compound with a penetrating oil, forming an emulsion of said penetrating oil, and then mixing said emulsion with an emulsion of a slow drying oil.

8. An insecticide comprising an emulsion of a penetrating oil containing a toxic compound soluble in said oil in preference to water intimately mixed with an emulsion of slow drying oil.

9. An insecticide comprising a major ingredient, an emulsion of a penetrating oil containing a toxic compound belonging to the group of alkaloids and cyanogen derivatives combined with a long chain compound and soluble in said oil in preference to water, and an emulsion of a slow drying oil.

10. An insecticide comprising an emulsion of a penetrating oil containing an alkaloid combined with a fatty acid and saturated with hydrocyanic acid, and an emulsion of a slow drying oil mixed therewith.

11. An insecticide comprising a mixture of two uncoalescent emulsions, one of said emulsions containing a light penetrating oil, and the other emulsion containing a heavy slow drying oil.

12. An insecticide comprising an emulsion of slow drying oil containing a toxic compound soluble in said oil in preference to water, intimately mixed with an emulsion of a penetrating oil.

Signed at Whittier, Calif., this 11th day of August, 1927.

IRA G. McBETH.
JOHN R. ALLISON.